United States Patent [19]

Miura et al.

[11] Patent Number: 4,845,057

[45] Date of Patent: Jul. 4, 1989

[54] HALIDE GLASS

[75] Inventors: Kiyotaka Miura, Akishima; Toshiharu Yamashita, Hachioji; Minoru Tokida, Tachikawa, all of Japan

[73] Assignee: Hoya Corporation, Tokyo, Japan

[21] Appl. No.: 256,635

[22] Filed: Oct. 12, 1988

[30] Foreign Application Priority Data

Oct. 16, 1987 [JP] Japan ................................ 62-261250

[51] Int. Cl.⁴ .......................... C03C 3/32; C03C 4/10; C03C 13/04
[52] U.S. Cl. ...................................... 501/40; 501/37; 501/904
[58] Field of Search ........................... 501/40, 37, 904

[56] References Cited

U.S. PATENT DOCUMENTS 4,308,066  12/1981  Mitachi et al. ........................ 501/37
4,346,176   8/1982  Kanamori et al. .................... 501/40
4,761,387   8/1988  Tokida et al. ......................... 501/40

Primary Examiner—Mark L. Bell
Attorney, Agent, or Firm—Nixon & Vanderhye

[57] ABSTRACT

The fluoride glass of the present invention, which contains, as anions, a small amount of chlorine in addition to fluorine, has advantages such as (1) it is less liable to crystallize as compared with a fluoride glass containing no chlorine and yet shows substantially no deterioration in chemical durability and mechanical strength due to chlorine inclusion and (2) its refractive index can easily be changed by changing the addition amount of chlorine.

5 Claims, 1 Drawing Sheet

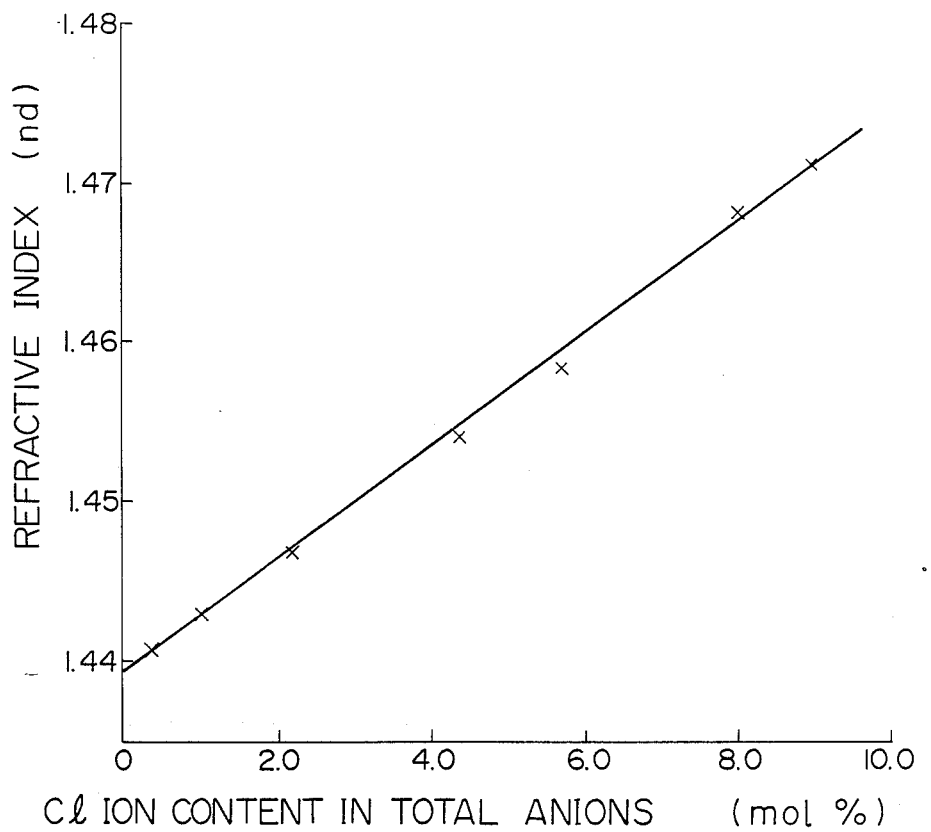

HALIDE GLASS

BACKGROUND OF THE INVENTION

Field of the Invention

The present invention relates to a halide glass used as an infrared-transmitting material. The halide glass of the present invention is used particularly in a glass fiber for long distance optical communication, an infrared optical fiber for thermometer, a window for infrared laser, etc.

Description of the Prior Art

Fluorozirconate glasses composed mainly of zirconium fluoride (Japanese Patent Publication No. 24349/1986) and fluoroaluminate glasses composed mainly of aluminum fluoride are known as an infrared-transmitting material having a good transmitting property over an ultraviolet to near-infrared or middle-infrared region. Mixed halide glasses (Japanese Patent Application Kokai (Laid-Open) No. 264344/1985) are also known as said material.

Of these glasses, fluorozirconate glasses have relatively excellent devitrification resistance as fluoride glasses and can easily be made into a fiber; however, they have poor chemical durability and insufficient mechanical strength. Meanwhile, there have been reported fluoroaluminate glasses having excellent chemical durability and excellent mechanical strength; however, they have poor devitrification resistance and accordingly are difficult to make them into an optical fiber.

The present inventors found a novel fluoride glass composed mainly of aluminum fluoride, having (1) excellent chemical durability and excellent mechanical strength and moreover, unlike the conventional fluoride glass composed mainly of aluminum fluoride, (2) such thermal stability as to enable the fiber drawing, and filed a patent application therefor (Japanese Patent Application No. 36382/1987). This fluoride glass, however, is very liable to cause unhomogeneous nucleation and consequently crystallization from the glass surface; this invites in some cases crystallization from the surface when the glass is made into a fiber, and the resulting fiber tends to have scattering loss by the crystal. The glass forming range of this glass is narrow at which the glass has such stability as to enable the fiber drawing When an optical fiber composed of a core glass and a clad glass is produced from said glass by changing the glass compositions for the core glass and the clad glass to allow them to have different refractive indices, the stability of the glass has been sacrificed

SUMMARY OF THE INVENTION

An object of the present invention is to provide a halide glass which is free from the drawbacks of the glass described in Japanese Patent Application No. 36382/1987, has excellent chemical durability and excellent mechanical strength, has stability suitable for the fiber drawing, and when made into an optical fiber, can easily make a necessary refractive index difference between core and clad glasses without the reduction of the glass stability against crystallization.

Other objects will be apparent from the following description and drawing.

The above objects have been achieved by substituting part of the fluorine ion in the fluoride glass described in the above Japanese Patent Application No. 36382/1987, with chlorine ion.

The present invention relates to a halide glass comprising, as cations, Al ion, Zr ion and/or Hf ion and at least one ion selected from Ca ion, Sr ion and Ba ion and, as anions, F ion and Cl ion, wherein the proportion of each cation in the total cations in terms of mol % is such that Al is 20–45%, Zr ion and/or Hf ion is 0.5–25%, Ca ion is 0–42%, Sr ion is 0–25%, Ba ion is 0–25%, and the total of Ca ion, Sr ion and Ba ion is 20–70%, and the proportion of each anion in the total anions in terms of mol % is such that $90\% \leqq F$ ion $< 100\%$ and $0\% < Cl$ ion $\leqq 10\%$.

The present invention relates further to a halide glass comprising, as cations, Al ion, Zr ion and/or Hf ion, at least one ion selected from Ca ion, Sr ion and Ba ion and at least one additional ion selected from Mg ion, Y ion and/or lanthanoid element ions, Zn ion, Cd ion, In ion, Ga ion, Pb ion and alkali metal ions and, as anions, F ion and Cl ion, wherein the proportion of each cation in the total cations in terms of mol % is such that Al ion is 20–45%, Zr ion and/or Hf ion is 0.5–25%, Ca ion is 0–42%, Sr ion is 0–25%, Ba ion is 0–25%, the total of Ca ion, Sr ion and Ba ion is 20–70%, and with respect to the additional ions, Mg ion is 0–15%, Y ion and/or lanthanoid element ions are 0–25%, Zn ion is 0–20%, Cd ion is 0–20%, In ion is 0–10%, Ga ion is 0–10%, Pb ion is 0–25%, alkali metal ions are 0–20%, and the total of the additional ions is 1–55%, and the proportion of each anion in the total anions in terms of mol % is such that $90\% \leqq F$ ion $< 100\%$ and $0\% < Cl$ ion $\leqq 10\%$.

BRIEF DESCRIPTION OF THE DRAWING

Figure is a graph showing a relationship between the refractive index and the Cl content in total anions, of a halide glass.

DETAILED DESCRIPTION OF THE INVENTION

In the halide glass of the present invention, part of the F ion in the above-mentioned fluoride glass containing cations at desired concentrations is substituted with Cl ion and accordingly there are present two anions, i.e. F ion and Cl ion; as a result, the present halide glass has improved stability and a substantially reduced tendency of crystallization from glass inside or surface. Therefore, when the present halide glass is used for production of an infrared-transmitting optical fiber, there occurs no crystallization thus making the fiber drawing easy, as compared with a fluoride glass containing the same cations at the same concentrations but containing no Cl ion.

In the above halide glass, when the cations are present in amounts less than or more than the respective restricted limits, crystallization occurs easily making it difficult to obtain a stable glass. The preferable proportion of each cation in the total cations in terms of mol % is as follows. With respect to the essential cations, Al ion is 26–40%, Zr ion and/or Hf ion is 3–20%, Ca ion is 10–38%, Sr ion is 3–20%, and Ba ion is 3–22%; and with respect to the additional ions, Mg ion is 0–10%, Y ion and/or lanthanoid element ions are 0–15%, Zn ion is 0–15%, Cd ion is 0–15%, In ion is 0–8%, Ga ion is 0–8%, Pb ion is 0–20%, and alkali metal ions are 0–15%. When Cl ion as an anion is present in an amount less than the restricted limit, crystallization from glass surface is liable to occur during glass production or when the glass is made into a fiber. When the Cl ion is present in an amount more than the limit, crystallization in glass inside or phase separation tends to occur making it difficult to obtain a stable glass. The preferable proportion of Cl ion in the total anions is 0.4–9 mol %. The especially preferable proportion of Cl ion is 2.2–6.5 mol % as is clear in Examples to be described later.

As is shown in FIGURE, when in a fluoride glass, part of the F ion contained therein is substituted with Cl ion and the Cl ion content is gradually increased, the refractive index of the fluoride glass increases gradually. Therefore, when two fluoride glasses each containing the same cations of the same concentrations but Cl ion of different concentration are used as core and clad materials for optical fiber, respectively, there can be produced an infrared-transmitting optical fiber having, between the core and the clad, an appropriate difference in refractive index and substantially no differences in other properties.

The present invention is described in more detail below by way of Examples. However, it should be understood that the present invention is not restricted to these Examples. Example 1 and Comparative Example

Example 1 and Comparative Example

Fluoride materials consisting of $AlF_3$, $ZrF_4$, $YF_3$, $MgF_2$, $CaF_2$, $SrF_2$, $BaF_2$ and $NaF$ were weighed and mixed so that the proportion of each cation in the total cations in terms of mol % became 30.2% (Al), 10.2% (Zr), 8.3% (Y), 3.6% (Mg), 20.3% (Ca), 13.2% (Sr), 10.5% (Ba) and 3.7% (Na) and the proportion of F ion in the total anions in terms of mol % became 100%. To 100 g of this mixture was added 5 g of $NH_4Cl$. The resulting mixture was placed in a carbon crucible (a vitreous carbon crucible may be used) and melted at 900° C. for 2 hours in argon atmosphere. The resulting melt was quenched to 390° C. and then annealed to room temperature. The obtained glass was colorless transparent disc-shaped glass of 50 mm (diameter)×13 mm (thickness). A fluorescent X-ray analysis confirmed that the glass contained 0.4 mol %, based on the total anions, of Cl ion. This glass was cut into a shape and size of 30 mm×30 mm ×5 mm and then subjected to six-surfaces polishing; a He-Ne laser beam was applied to the article to observe the loca of the beam caused by its scattering; however, no locus was visible to the naked eye.

In order to compare the stability of the above glass with that of a fluoride glass of Comparative Example containing the same cations at the same concentrations but containing no Cl ion, the respective glasses produced in the same melting conditions were weighed by 20 mg each; each glass sample was heated to 750° C. at a rate of 200° C./min to melt completely and then cooled to room temperature at a rate of 10° C./min; according to this heating and cooling cycle, each glass sample was subjected to DSC (differential scanning calorimetry). As a result, in the glass of the present invention containing Cl ion, no heat generation caused by crystallization was seen on the DSC curve during cooling, and no crystal was found when the glass sample after DSC was observed with an optical microscope. Meanwhile, in the glass of Comparative Example containing no Cl ion, heat generation caused by crystallization was seen on the DSC curve, and the glass sample after DSC had a white crystal on the surface to the extent that the white crystal was visible to the naked eye. This fact indicates that the fluoride glass of the present Example containing Cl ion is less liable to crystallize than the fluoride glass of Comparative Example containing only F ion as anion.

Example 2

The procedure of Example 1 was repeated except that the amount of $NH_4Cl$ was changed to 10 g, to obtain a colorless transparent disc-shaped glass of 50 mm (diameter) ×13 mm (thickness). A fluorescent X-ray analysis confirmed that the glass contained 1.0 mol %, based on the total anions, of Cl ion.

In order to measure its stability, the glass was subjected to DSC in the same manner as in Example 1. No crystal was found as in Example 1.

EXAMPLE 3

The procedure of Example 1 was repeated except that the amount of $NH_4Cl$ was changed to 20 g, to obtain a colorless transparent disc-shaped glass of 50 mm (diameter) ×13 mm (thickness). A fluorescent X-ray analysis confirmed that the glass contained 2.2 mol %, based on the total anions, of Cl ion.

In order to measure its stability, the glass was subjected to DSC in the same manner as in Example 1. No crystal was found as in Example 1.

EXAMPLE 4

There was prepared the same mixture of fluoride materials as in Example 1. To 100 g of this mixture was added 15 g of $NH_4Cl$. The resulting mixture was placed in a carbon crucible and then melted at 900° C. for 2 hours while passing an argon gas containing 10% by volume of HCl, at a rate of 5 liters/min. The resulting fluoride melt was quenched to 390° C. and then annealed to room temperature to obtain a colorless transparent disc-shaped glass of 50 mm (diameter) ×13 mm (thickness). A fluorescent X-ray analysis confirmed that the glass contained 3.3 mol %, based on the total anions, of Cl ion.

In order to measure its stability, the glass was subjected to DSC in the same manner is in Example 1. No crystal was found as in Example 1.

EXAMPLE 5

The procedure of Example 4 was repeated except that the amount of $NH_4Cl$ was changed to 20 g, to obtain a colorless transparent disc-shaped glass of 50 mm (diameter) ×13 mm (thickness). A fluorescent X-ray analysis confirmed that the glass contained 4.4 mol %, based on the total anions, of Cl ion.

In order to measure its stability, the glass was subjected to DSC in the same manner as in Example 1. No crystal was found as in Example 1.

EXAMPLE 6

There was prepared the same mixture of fluoride materials as in Example 1. 100 g of this mixture was placed in a carbon crucible and melted at 900° C. for 2 hours in an argon atmosphere. Then, the melt was subjected to bubbling for 20 minutes with an argon gas containing 5% by volume of $Cl_2$ gas, supplied through a carbon pipe, after which the melt was allowed to stand for 30 minutes. The resulting fluoride melt was quenched to 390° C. and then annealed to room temperature to obtain a colorless transparent disc-shaped glass of 50 mm (diameter) × 13 mm (thickness). A fluorescent X-ray analysis confirmed that the glass contained 5.7 mol %, based on the total anions, of Cl ion.

In order to measure its stability, the glass was subjected to DSC in the same manner as in Example 1. No crystal was found as in Example 1.

EXAMPLE 7

There was prepared the same mixture of fluoride materials as in Example 1. To 100 g of this mixture was added 20 g of $NH_4Cl$. The resulting mixture was placed in a carbon crucible and melted at 900° C. for 2 hours while passing an argon gas containing 5% by volume of $Cl_2$ gas at a rate of 5 liters/min. The melt was then subjected to bubbling for 30 minutes with an argon gas containing 5% by volume of $Cl_2$ gas, supplied through a carbon pipe, after which the melt was allowed to stand for 30 minutes. The resulting fluoride melt was quenched to 390° C. and then annealed to room temperature to obtain a colorless transparent disc-shaped glass of 50 mm (diameter) ×13 mm (thickness) A fluorescent X-ray analysis confirmed that the glass contained 6.5 mol %, based on the total anions, of Cl in. In order to measure its stability, the glass was subjected to DSC in the same manner as in Example 1. No crystal was found as in Example 1.

EXAMPLE 8

Fluoride materials ($AlF_3$, $ZrF_4$, $YF_3$, $MgF_2$, $CaF_2$ and $SrF_2$) and chloride materials ($BaCl_2$ and $NaCl$) were weighed and mixed so that the proportion of each cation in the total cations in terms of mol % became 30.2% (Al), 10.2% (Zr), 8.3%(Y), 3.6% (Mg), 20.3% (Ca), 13.2% (Sr), 10.5% (Ba) and 3.7% (Na) and the proportion of each anion in the total anions in terms of mol % became 97.0% (F) and 3.0% (Cl). To 100 g of this mixture was added 20 g of $NH_4Cl$. The resulting mixture was placed in a carbon crucible and melted at 900° C. for 2 hours in an argon atmosphere. The resulting melt was quenched to 390° C. and then annealed to room temperature to obtain a colorless transparent disc-shaped glass of 50 mm (diameter) ×13 mm (thickness). A fluorescent X-ray analysis confirmed that the glass contained 8.0 mol %, based on the total anions, of Cl ion. In order to measure its stability, the glass was subjected to DSC in the same manner as in Example 1. No crystal was found as in Example 1.

EXAMPLE 9

The procedure of Example 7 was repeated except that the amount of $NH_4Cl$ was changed to 30 g, to obtain a colorless transparent disc-shaped glass of 50 mm (diameter) ×13 mm (thickness). A fluorescent X-ray analysis confirmed that the glass contained 9.0 mol %, based on the total anions, of Cl ion. In order to measure its stability, the glass was subjected to DSC in the same manner as in Example 1. No crystal was found as in Example 1.

Next, there are shown in Table 1 the chlorine content, refractive index, Knoop hardness, weight loss in water durability and thermal characteristics of each glass obtained in the above Examples. There are also shown in Table 1 the properties of the glass of Comparative Example containing no Cl ion. In Table 1, $(Tx-Tg)/Tm$ (Tx is a starting temperature of crystallization, Tg is a glass transition temperature, and Tm is a peak melting temperature of crystal and is approximately equal to a liquidus temperature) is a value showing the stability of a glass, and it is generally believed that the larger the above value of a glass, the more stable to crystallization is the glass. As is appreciated from these values of Table 1, the especially preferable proportion of Cl ion in the total anions is 2.2–6.5 mol %. That is, the above value $((Tx-Tg)/Tm)$ increases sharply when the Cl ion content exceeds 2.2 mol % and the value decreases when the Cl ion content becomes higher than 6.5 mol %. Table 1 also indicates that the addition of Cl ion can easily achieve the change in refractive index without impairing the chemical durability and mechanical strength of glass and can make the resulting glass stable to crystallization

EXAMPLES 10-49

The procedure of Example 1 was repeated to obtain colorless transparent disc-shaped glasses of 50 mm (diameter) x 3 mm (thickness) of Examples 10-49. The type and concentration of each ion contained in each glass are shown in Table 2. In order to measure the stability of each glass, it was subjected to DSC in the same manner as in Example 1. No crystal was found as in Example 1.

TABLE 1

|  | Chlorine content (mol %) | Refractive index (nd) | Knoop hardness (kg/mm$^2$) | Weight loss in water durability (wt. %) | Tg (°C.) | TTx (°C.) | (Tx − Tg)/Tm |
|---|---|---|---|---|---|---|---|
| Example 1 | 0.4 | 1.44060 | 317 | 0.24 | 380 | 479 | 0.151 |
| Example 2 | 1.0 | 1.44276 | 320 | 0.25 | 376 | 477 | 0.155 |
| Example 3 | 2.2 | 1.44685 | 328 | 0.26 | 369 | 472 | 0.159 |
| Example 4 | 3.3 | 1.45102 | 320 | 0.26 | 361 | 475 | 0.180 |
| Example 5 | 4.4 | 1.45414 | 312 | 0.27 | 352 | 493 | 0.225 |
| Example 6 | 5.7 | 1.45944 | 306 | 0.24 | 350 | 463 | 0.192 |
| Example 7 | 6.5 | 1.46112 | 307 | 0.28 | 342 | 459 | 0.190 |
| Example 8 | 8.0 | 1.46800 | 306 | 0.29 | 336 | 445 | 0.180 |
| Example 9 | 9.0 | 1.47130 | 306 | 0.30 | 333 | 442 | 0.181 |
| Comparative Example | 0.0 | 1.43928 | 317 | 0.24 | 383 | 480 | 0.147 |

TABLE 2 - 1

| | | Examples | | | | | | |
|---|---|---|---|---|---|---|---|---|
| | | 1 | 2 | 3 | 4 | 5 | 6 | 7 |
| Cationic components (mol %) (100 mol % in total) | Al | 30.20 | 30.20 | 30.20 | 30.20 | 30.20 | 30.20 | 30.20 |
| | Zr | 10.20 | 10.20 | 10.20 | 10.20 | 10.20 | 10.20 | 10.20 |
| | Hf | | | | | | | |
| | (A) | 10.20 | 10.20 | 10.20 | 10.20 | 10.20 | 10.20 | 10.20 |
| | Ca | 20.30 | 20.30 | 20.30 | 20.30 | 20.30 | 20.30 | 20.30 |
| | Sr | 13.20 | 13.20 | 13.20 | 13.20 | 13.20 | 13.20 | 13.20 |
| | Ba | 10.50 | 10.50 | 10.50 | 10.50 | 10.50 | 10.50 | 10.50 |
| | (B) | 44.00 | 44.00 | 44.00 | 44.00 | 44.00 | 44.00 | 44.00 |
| | Mg | 3.60 | 3.60 | 3.60 | 3.60 | 3.60 | 3.60 | 3.60 |
| | Y | 8.30 | 8.30 | 8.30 | 8.30 | 8.30 | 8.30 | 8.30 |
| | La | | | | | | | |
| | Gd | | | | | | | |
| | Zn | | | | | | | |
| | Cd | | | | | | | |
| | In | | | | | | | |
| | Ga | | | | | | | |
| | Pb | | | | | | | |

TABLE 2 - 1-continued

| | | Examples | | | | | | |
|---|---|---|---|---|---|---|---|---|
| | | 1 | 2 | 3 | 4 | 5 | 6 | 7 |
| | Li | | | | | | | |
| | Na | 3.70 | 3.70 | 3.70 | 3.70 | 3.70 | 3.70 | 3.70 |
| | K | | | | | | | |
| | Cs | | | | | | | |
| | (C) | 15.60 | 15.60 | 15.60 | 15.60 | 15.60 | 15.60 | 15.60 |
| Anionic components (mol %) (100 mol % in total) | F | 99.6 | 99.0 | 97.80 | 96.7 | 95.60 | 94.30 | 93.50 |
| | Cl | 0.4 | 1.0 | 2.20 | 3.3 | 4.40 | 5.70 | 6.50 |

(A) = Zr and/or Hf
(B) = Total of Ca, Sr and Ba
(C) = Total of 13 components from Mg to Cs

TABLE 2 - 2

| | | Examples | | | | | | |
|---|---|---|---|---|---|---|---|---|
| | | 8 | 9 | 10 | 11 | 12 | 13 | 14 |
| Cationic components (mol %) (100 mol % in total) | Al | 30.20 | 30.20 | 34.09 | 34.09 | 34.09 | 22.09 | 22.09 |
| | Zr | 10.20 | 10.20 | 7.11 | | 7.11 | 1.11 | 19.11 |
| | Hf | | | | 7.11 | | 18.00 | |
| | (A) | 10.20 | 10.20 | 7.11 | 7.11 | 7.11 | 19.11 | 19.11 |
| | Ca | 20.30 | 20.30 | 23.09 | 23.09 | 3.09 | 23.09 | 23.09 |
| | Sr | 13.20 | 13.20 | 14.96 | 14.96 | 10.96 | 14.96 | 14.96 |
| | Ba | 10.50 | 10.50 | 10.32 | 10.32 | 20.32 | 10.32 | 10.32 |
| | (B) | 44.00 | 44.00 | 48.37 | 48.37 | 34.37 | 48.37 | 48.37 |
| | Mg | 3.60 | 3.60 | 4.02 | 4.02 | 4.02 | 4.02 | 4.02 |
| | Y | 8.30 | 8.30 | 3.73 | 3.73 | 3.73 | 2.57 | 2.57 |
| | La | | | | | | 1.16 | 1.16 |
| | Gd | | | | | | | |
| | Zn | | | | | | | |
| | Cd | | | | | | | |
| | In | | | | | | | |
| | Ga | | | | | | | |
| | Pb | | | | | 14.00 | | |
| | Li | | | | | | | |
| | Na | 3.70 | 3.70 | 2.68 | 2.68 | 2.68 | 2.68 | 2.68 |
| | K | | | | | | | |
| | Cs | | | | | | | |
| | (C) | 15.60 | 15.60 | 10.43 | 10.43 | 24.43 | 10.43 | 10.43 |
| Anionic components (mol %) (100 mol % in total) | F | 92.00 | 91.0 | 99.00 | 97.80 | 97.80 | 97.80 | 97.80 |
| | Cl | 8.00 | 9.0 | 1.00 | 2.20 | 2.20 | 2.20 | 2.20 |

(A) = Zr and/or Hf
(B) = Total of Ca, Sr and Ba
(C) = Total of 13 components from Mg to Cs

TABLE 2 - 3

| | | Examples | | | | | | |
|---|---|---|---|---|---|---|---|---|
| | | 15 | 16 | 17 | 18 | 19 | 20 | 21 |
| Cationic components (mol %) (100 mol % in total) | Al | 34.09 | 34.09 | 34.09 | 34.09 | 34.09 | 34.09 | 34.09 |
| | Zr | 7.11 | 2.11 | 7.11 | 7.11 | 7.11 | 7.11 | 7.11 |
| | Hf | | 5.00 | | | | | |
| | (A) | 7.11 | 7.11 | 7.11 | 7.11 | 7.11 | 7.11 | 7.11 |
| | Ca | 17.19 | 23.09 | 23.09 | 23.09 | 23.09 | 23.09 | 16.48 |
| | Sr | 11.13 | 14.96 | 14.96 | 14.96 | 14.96 | 14.96 | 10.68 |
| | Ba | 7.68 | 10.32 | 10.32 | 10.32 | 10.32 | 14.34 | 7.36 |
| | (B) | 36.00 | 48.37 | 48.37 | 48.37 | 48.37 | 52.39 | 34.52 |
| | Mg | 2.99 | 4.02 | 4.02 | 4.02 | 4.02 | | 2.87 |
| | Y | 2.57 | 3.73 | | 3.73 | 3.73 | 3.73 | 3.73 |
| | La | 1.16 | | | | | | |
| | Gd | | | 3.73 | | | | |
| | Zn | | | | | | | |
| | Cd | | | | | | | |
| | In | | | | | | | |
| | Ga | | | | | | | |
| | Pb | | | | | | | 15.00 |
| | Li | | | | 2.68 | | | |
| | Na | 16.08 | 2.68 | 2.68 | | | 2.68 | 2.68 |
| | K | | | | | | | |
| | Cs | | | | | 2.68 | | |
| | (C) | 22.80 | 10.43 | 10.43 | 10.43 | 10.43 | 6.41 | 24.28 |
| Anionic components (mol %) (100 mol % in total) | F | 97.80 | 97.80 | 97.80 | 97.80 | 97.80 | 97.80 | 97.80 |
| | Cl | 2.20 | 2.20 | 2.20 | 2.20 | 2.20 | 2.20 | 2.20 |

(A) = Zr and/or Hf
(B) = Total of Ca, Sr and Ba
(C) = Total of 13 components from Mg to Cs

TABLE 2 - 4

| | | Examples | | | | | | |
|---|---|---|---|---|---|---|---|---|
| | | 22 | 23 | 24 | 25 | 26 | 27 | 28 |
| Cationic components (mol %) (100 mol % in total) | Al | 29.09 | 34.09 | 34.09 | 32.98 | 20.08 | 29.09 | 29.09 |
| | Zr | 7.11 | 7.11 | 7.11 | 1.11 | | 4.02 | 7.11 |
| | Hf | | | | | 20.00 | | |
| | (A) | 7.11 | 7.11 | 7.11 | 1.11 | 20.00 | 4.02 | 7.11 |
| | Ca | 23.09 | 23.09 | 24.72 | 23.09 | 20.11 | 20.11 | 20.09 |
| | Sr | 14.96 | 14.96 | 15.73 | 14.96 | 13.03 | 13.03 | 17.96 |
| | Ba | 10.32 | | 10.60 | 10.32 | 11.57 | 11.57 | 10.32 |
| | (B) | 48.37 | 38.05 | 51.05 | 48.37 | 44.71 | 44.71 | 48.37 |
| | Mg | 4.02 | 4.02 | 4.02 | 4.02 | 3.50 | 3.50 | 9.02 |
| | Y | 3.73 | 3.73 | 2.57 | 10.84 | 2.24 | 13.76 | 3.73 |
| | La | | | 1.16 | | 1.52 | | |
| | Gd | | | | | | | |
| | Zn | | 13.00 | | | | | |
| | Cd | | | | | | | |
| | In | 5.00 | | | | | | |
| | Ga | | | | | | | |
| | Pb | | | | | | | |
| | Li | | | | | | | |
| | Na | 2.68 | | | 2.68 | 4.92 | 4.92 | 2.68 |
| | K | | | | | | | |
| | Cs | | | | | 3.03 | | |
| | (C) | 15.43 | 20.75 | 7.75 | 17.54 | 15.21 | 22.18 | 15.43 |
| Anionic components (mol %) (100 mol % in total) | F | 97.80 | 97.80 | 97.80 | 97.80 | 97.80 | 97.80 | 97.80 |
| | Cl | 2.20 | 2.20 | 2.20 | 2.20 | 2.20 | 2.20 | 2.20 |

(A) = Zr and/or Hf
(B) = Total of Ca, Sr and Ba
(C) = Total of 13 components from Mg to Cs

TABLE 2 - 5

| | | Examples | | | | | | |
|---|---|---|---|---|---|---|---|---|
| | | 29 | 30 | 31 | 32 | 33 | 34 | 35 |
| Cationic components (mol %) (100 mol % in total) | Al | 34.09 | 34.09 | 29.09 | 29.09 | 29.09 | 29.09 | 25.59 |
| | Zr | 7.11 | 7.11 | 4.02 | 4.02 | 4.02 | 4.02 | 24.61 |
| | Hf | | | | | | | |
| | (A) | 7.11 | 7.11 | 4.02 | 4.02 | 4.02 | 4.02 | 24.61 |
| | Ca | 33.09 | 38.05 | 24.96 | 9.00 | 24.96 | 24.96 | 10.33 |
| | Sr | 4.96 | | | | | | 15.94 |
| | Ba | 10.32 | 10.32 | 10.32 | 11.32 | 10.32 | 11.52 | 13.31 |
| | (B) | 48.37 | 48.37 | 35.28 | 20.32 | 35.28 | 36.48 | 39.58 |
| | Mg | 4.02 | 4.02 | 6.18 | 6.18 | 6.18 | 14.98 | 2.77 |
| | Y | 3.73 | 3.73 | 3.73 | 3.73 | 3.73 | 3.73 | 1.77 |
| | La | | | | | 15.00 | | 2.04 |
| | Gd | | | 15.00 | | | | |
| | Zn | | | | | 4.02 | 4.02 | |
| | Cd | | | | 15.00 | | | |
| | In | | | | | | | |
| | Ga | | | | | | 5.00 | |
| | Pb | | | | 19.98 | | | |
| | Li | | | | | | | |
| | Na | 2.68 | 2.68 | 2.68 | 1.68 | 2.68 | 2.68 | 3.64 |
| | K | | | 4.02 | | | | |
| | Cs | | | | | | | |
| | (C) | 10.43 | 10.43 | 31.61 | 46.57 | 31.61 | 30.41 | 10.22 |
| Anionic components (mol %) (100 mol % in total) | F | 97.80 | 97.80 | 97.80 | 97.80 | 97.80 | 97.80 | 97.80 |
| | Cl | 2.20 | 2.20 | 2.20 | 2.20 | 2.20 | 2.20 | 2.20 |

TABLE 2 - 5-continued

|  |  | Examples | | | | | | |
|---|---|---|---|---|---|---|---|---|
|  |  | 29 | 30 | 31 | 32 | 33 | 34 | 35 |
| in total) | | | | | | | | |

(A) = Zr and/or Hf
(B) = Total of Ca, Sr and Ba
(C) = Total of 13 components from Mg to Cs

TABLE 2 - 6

|  |  | Examples | | | | | | |
|---|---|---|---|---|---|---|---|---|
|  |  | 36 | 37 | 38 | 39 | 40 | 41 | 42 |
| Cationic | Al | 39.09 | 44.09 | 26.09 | 20.08 | 29.09 | 34.09 | 29.09 |
| components | Zr | 10.66 |  |  | 7.11 | 7.11 | 7.11 | 4.02 |
| (mol %) | Hf |  | 3.11 | 24.11 |  |  |  |  |
| (100 mol % | (A) | 10.66 | 3.11 | 24.11 | 7.11 | 7.11 | 7.11 | 4.02 |
| in total) | Ca | 18.98 | 18.45 | 15.94 | 32.58 | 27.92 |  | 41.96 |
|  | Sr | 12.30 | 11.95 | 10.33 | 21.10 | 18.09 | 24.18 | 11.32 |
|  | Ba | 10.30 | 8.79 | 13.31 | 16.30 | 13.98 | 24.19 | 3.18 |
|  | (B) | 41.58 | 39.19 | 39.58 | 69.98 | 59.99 | 48.37 | 56.46 |
|  | Mg | 3.30 | 7.21 | 2.77 |  | 0.98 | 4.02 | 4.02 |
|  | Y | 1.35 | 3.27 | 1.77 | 2.83 | 2.83 | 3.73 | 3.73 |
|  | La |  | 0.45 | 2.04 |  |  |  |  |
|  | Gd |  |  |  |  |  |  |  |
|  | Zn |  |  |  |  |  |  |  |
|  | Cd |  |  |  |  |  |  |  |
|  | In |  |  |  |  |  |  |  |
|  | Ga |  |  |  |  |  |  |  |
|  | Pb |  |  |  |  |  |  |  |
|  | Li |  |  |  |  |  |  |  |
|  | Na | 4.02 | 2.68 | 3.64 |  |  | 2.68 | 2.68 |
|  | K |  |  |  |  |  |  |  |
|  | Cs |  |  |  |  |  |  |  |
|  | (C) | 8.67 | 13.61 | 10.22 | 2.83 | 3.81 | 10.43 | 10.43 |
| Anionic | F | 97.80 | 97.80 | 97.80 | 97.80 | 97.80 | 97.80 | 97.80 |
| components | Cl | 2.20 | 2.20 | 2.20 | 2.20 | 2.20 | 2.20 | 2.20 |
| (mol %) | | | | | | | | |
| (100 mol % in total) | | | | | | | | |

(A) = Zr and/or Hf
(B) = Total of Ca, Sr and Ba
(C) = Total of 13 components from Mg to Cs

TABLE 2 - 7

|  |  | Examples | | | | | | |
|---|---|---|---|---|---|---|---|---|
|  |  | 43 | 44 | 45 | 46 | 47 | 48 | 49 |
| Cationic | Al | 34.09 | 37.82 | 37.82 | 21.59 | 26.09 | 37.82 | 37.82 |
| components | Zr | 7.11 | 10.00 | 10.00 | 4.02 | 4.02 | 11.13 |  |
| (mol %) | Hf |  |  |  |  |  |  | 11.13 |
| (100 mol % | (A) | 7.11 | 10.00 | 10.00 | 4.02 | 4.02 | 11.13 | 11.13 |
| in total) | Ca | 23.09 | 23.09 | 23.09 | 9.00 | 14.96 | 23.09 | 23.09 |
|  | Sr | 3.46 | 14.96 | 14.96 |  |  | 14.96 | 14.96 |
|  | Ba | 21.82 | 13.00 | 11.50 | 11.32 | 10.32 | 13.00 | 13.00 |
|  | (B) | 48.37 | 51.05 | 49.55 | 20.32 | 25.28 | 51.05 | 51.05 |
|  | Mg | 4.02 |  | 1.50 | 13.68 | 9.18 |  |  |
|  | Y | 3.73 | 1.13 | 1.13 | 3.73 | 13.73 |  |  |
|  | La |  |  |  | 15.00 |  |  |  |
|  | Gd |  |  |  |  |  |  |  |
|  | Zn |  |  |  |  | 4.02 |  |  |
|  | Cd |  |  |  |  | 15.00 |  |  |
|  | In |  |  |  |  |  |  |  |
|  | Ga |  |  |  |  |  |  |  |
|  | Pb |  |  |  | 19.98 |  |  |  |
|  | Li |  |  |  |  |  |  |  |
|  | Na | 2.68 |  |  | 1.68 | 2.68 |  |  |
|  | K |  |  |  |  |  |  |  |
|  | Cs |  |  |  |  |  |  |  |
|  | (C) | 10.43 | 1.13 | 2.63 | 54.07 | 44.61 | 0 | 0 |
| Anionic | F | 97.80 | 97.80 | 97.80 | 97.80 | 97.80 | 97.80 | 97.80 |
| components | Cl | 2.20 | 2.20 | 2.20 | 2.20 | 2.20 | 2.20 | 2.20 |
| (mol %) | | | | | | | | |
| (100 mol % in total) | | | | | | | | |

(A) = Zr and/or Hf
(B) = Total of Ca, Sr and Ba
(C) = Total of 13 components from Mg to Cs According to the present invention, by substituting part of the fluorine contained in a fluoride glass, with chlorine, there can be obtained a glass which is less liable to crystallize as compared with said fluoride glass containing no chlorine. The thus produced glass shows substantially no deterioration in chemical durability and mechanical strength due to chlorine inclusion. Moreover, the refractive index of the glass can be varied easily by controlling the chlorine content in the glass; therefore, the chlorine inclusion in the glass is effective also in production of an optical fiber preform having a core and clad structure.

Thus, the present invention has made it possible to produce an infrared-transmitting material with excellent chemical durability and excellent mechanical strength, or to produce a high quality optical fiber preform unliable to cause crystallization.

The above-described embodiments are just examples of the present invention, and therefore, it will be apparent for those skilled in the art that many modifications and variations may be made without departing from the scope of the present invention.

What is claimed is:

1. A halide glass consisting essentially of, as cations, Al ion, Zr and/or Hf ion and at least one ion selected from the group consisting of Ca ion, Sr ion and Ba ion and, as anions, F ion and Cl ion, wherein the proportion of each cation in the total cations in terms of mol % is such that Al is 20-45%, Zr ion and/or Hf ion is 0.5-25%, Ca ion is 0-42%, Sr ion is 0-25%, Ba ion is 0-25%, and the total of Ca ion, Sr ion and Ba ion is 20-70%, and the proportion of each anion in the total anions in terms of mol % is such that 90% $\leq$ F ion < 100% and 0% < Cl ion $\leq$ 10%.

2. A halide glass according to claim 1, wherein the proportion of each cation in the total cations in terms of mol % is such that Al ion is 26-40%, Zr ion and/or Hf ion is 3-20%, Ca ion is 10-38%, Sr ion is 3-20%, Ba ion is 3-22%, and the total of Ca ion, Sr ion and Ba ion is 20-60%, and the proportion of each anion in the total anions in terms of mol % is such that 91% $\leq$ F ion $\leq$ 99.6% and 0.4% Cl ion $\leq$ 9%.

3. A halide glass consisting essentially of, as cations, Al ion, Zr ion, and/or Hf ion, at least one ion selected from the group consisting of Ca ion, Sr ion and Ba ion and at least one additional ion selected from the group consisting of Mg ion, Y ion and/or lanthanoid element ions, Zn ion, Cd ion, In ion, Ga ion, Pb ion and alkali metal ions and, as anions, F ion and Cl ion, wherein the proportion of each cation in the total cations in terms of mol % is such that Al ion is 20-45%, Zr ion and/or Hf ion is 0.5-25%, Ca ion is 0-42%, Sr ion is 0-25%, Ba ion is 0-25%, the total of Ca ion, Sr ion and Ba ion is 20-70%, and with respect to the additional ions, Mg ion is 0-15%, Y ion and/or lanthanoid element ions are 0-25%, Zn ion is 0-20%, Cd ion is 0-20%, In ion is 0-10%, Ga ion is 0-10%, Pb ion is 0-25%, alkali metal ions are 0-20%, and the total of the additional ions is 1-55%, and the proportion of each anion in the total anions in terms of mol % is such that 90% $\leq$ F ion < 100% and 0% < Cl ion $\leq$ 10%.

4. A halide glass according to claim 3, wherein the proportion of each cation in the total cations in terms of mol % is such that Al ion is 26-40%, Zr ion and/or Hf ion is 3-20%, Ca ion is 10-38%, Sr ion is 3-20%, Ba ion is 3-22%, the total of Ca ion, Sr ion and Ba ion is 20-60%, and with respect to the additional ions, Mg ion is 0-10%, Y ion and/or lanthanoid element ions are 0-15%, Zn ion is 0-15%, Cd ion is 0-15%, In ion is 0-8%, Ga ion is 0-8%, Pb ion is 0-20%, alkali metal ions are 0-15%, and the total of the additional ions is 2.5-45%, and the proportion of each anion in the total anions in terms of mol % is such that 91% ≦ F ion ≦ 99.6% and 0.4% ≦ Cl ion ≦ 9%.

5. A halide glass according to claim 2, wherein the proportion of each anion in the total anions in terms of mol % is such that 97.8% ≦ F ion ≦ 93.5% and 2.2% ≦ Cl ion ≦ 6.5%.

* * * * *